Patented June 25, 1929.

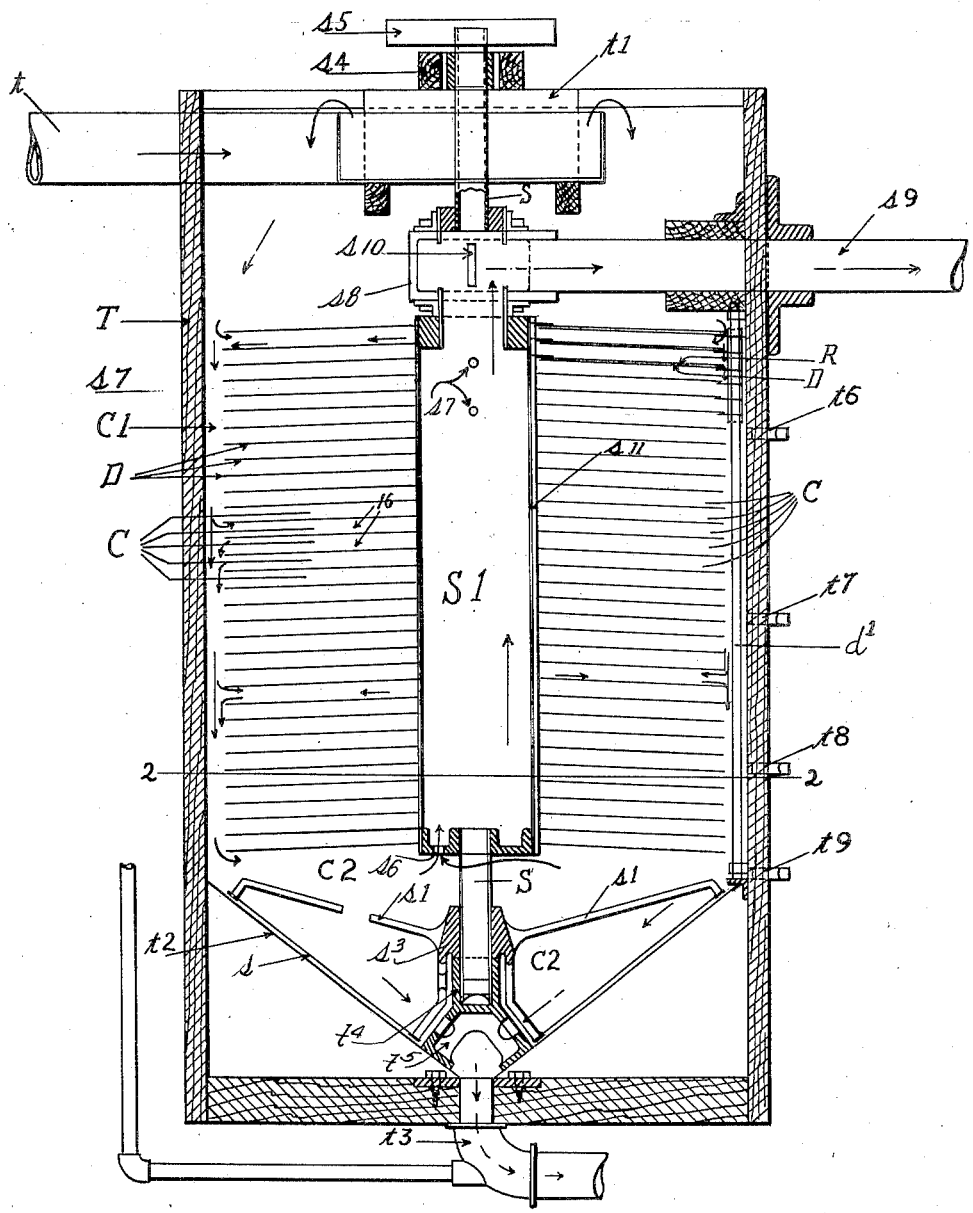

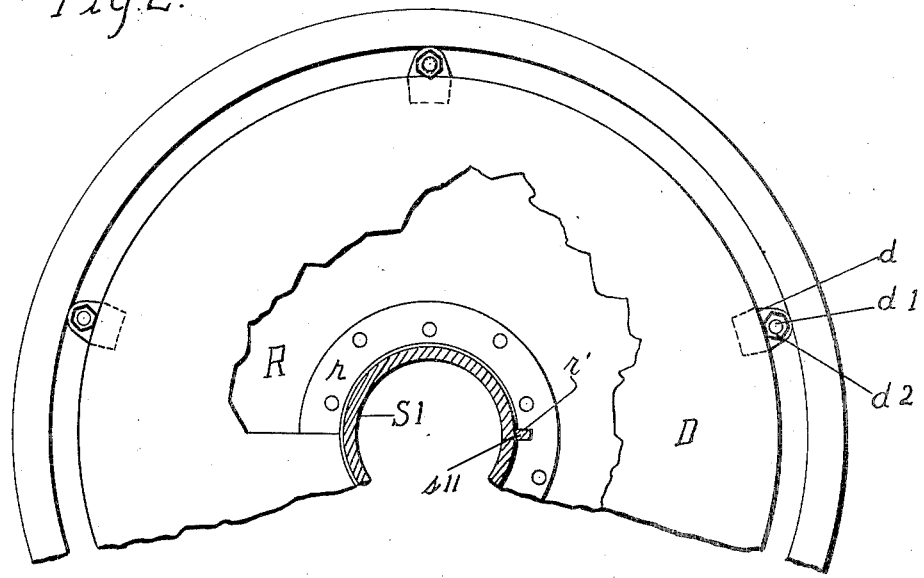
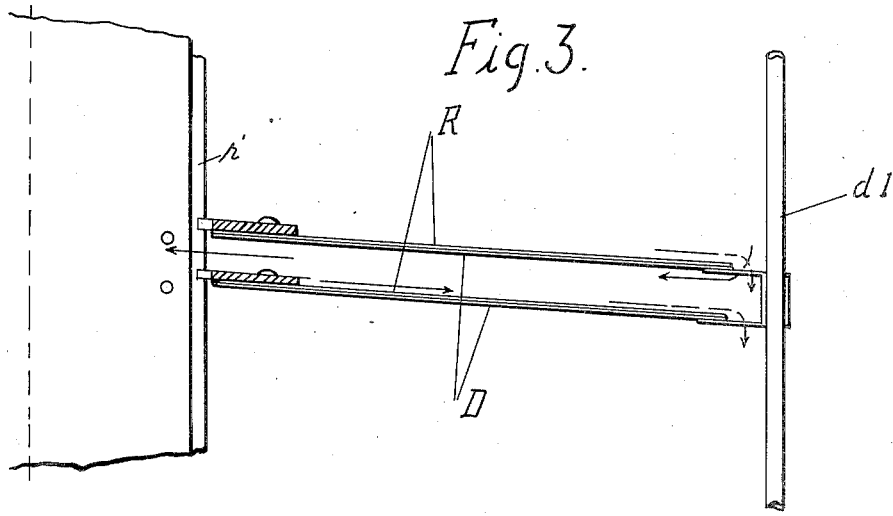
Inventor
Carl H. Nordell
By Walter A. Knight
Attorney

1,718,871

UNITED STATES PATENT OFFICE.

CARL H. NORDELL, OF CHICAGO, ILLINOIS.

METHOD OF AND MEANS FOR SEPARATING COMMINUTED MATTER FROM THE LIQUID IN WHICH IT IS IMMERSED.

Application filed August 19, 1926. Serial No. 130,226.

My invention relates to a method of and means for separating sediment from the liquid in which it is held in suspension.

The principal object of my invention is to provide a method of treating the liquid to be clarified in a quiescent state in shallow annular cells, taking off the clear liquid at the center and the sludge at the periphery.

Another object of my invention is to provide a new and highly concentrated apparatus for settling comminuted solids out of the liquid in which they are held in suspension, the collected comminuted solids being removed from one portion of the apparatus and the substantially clear liquid from another.

Another object of my invention is to take advantage of the power which the fast settling comminuted solids have of pulling down the finer and lighter material by the constant admixture of the solids settled out with a portion of the raw mixture to be treated.

In the particular embodiment of my invention selected for illustration:—

Figure 1 is a vertical axial section thru such a disc clarifier,

Fig. 2, is a cross section on the line 2—2 of Fig. 1, a part only being shown, and the rest broken away as unnecessary for the purpose of the illustration, and Fig. 3, an enlarged detail, is a vertical section through the pipe near its feather, and a cross section through one of the supporting discs and its rotating disc, one stay rod being shown at one side of the pipe only, and at the other broken away.

Referring now to the drawings, T is a stationary vertically placed cylindrical tank, preferably made of wood, with an inlet $t$ for the raw mixture of comminuted solids and fluid, terminating near the axis of the tank in a spill box $t^1$ whence the raw mixture overflows into the top of the tank. Outlets $t^6$, $t^7$, $t^8$, $t^9$ are provided thru the side of the tank, with a plug for each, so that a small quantity of the fluid contents of the tank may be drawn off for test purposes.

At its bottom the tank A is provided with a conical draining bottom with sloping sides $t^2$, terminating in a sludge discharge pipe $t^3$ secured to the bottom of the tank.

A hollow, rotatable shaft, S is placed axially of the tank T, is closed at its lower end, where it is provided with a plurality of scrapers $s$, each braced by a spider arm $s^1$, both $s$ and $s^1$ being fixed to the hub $s^3$, which is fixed to and revolves with the shaft S, and forms the upper part of a bearing on which the shaft rotates. The bottom part of the bearing $t^4$, is supported by legs $t^5$ each resting on the conical draining bottom $t^2$ of the tank T.

At its upper end, the shaft S is provided with a bearing $s^4$, and rotated through pulley $s^5$ or in any other suitable manner from any convenient source of power not shown.

The mid portion of the shaft S is provided with an enlargement $S^1$, with inlet orifices $s^6$, on its bottom end and others $s^7$ through its sides. Toward its upper end the shaft S passes through a stuffing box $s^8$, connected with a discharge pipe $s^9$, and substantially clear liquid flows upwardly through the hollow shaft S passes through outlet openings $s^{10}$ and leaves the tank thru the pipes $s^9$.

A relatively large number of thin, stiff stationary discs D which may be made of brass or other sheet metal, are loosely pierced by the enlarged portion $S^1$ of the shaft S and at their edges are provided with a plurality of tabs $d$ made integral with or as shown in the drawings, fixed, to the discs D. Each tab is pierced by a fixed stay rod $d^1$, and spacing collars $d^2$ maintain the discs D in uniform spaced relation to each other.

Upon each metal disc D rests a flexible disc R made of sheet rubber or other suitable material, preferably stiffened somewhat with embedded cloth or wire. Each disc R is provided with a central metal flange $r$ provided with a key-way at $r^1$ adapted to coact with a feather $s^{11}$ secured to the enlarged portion $S^1$ of the shaft S, ensuring the rotation of the discs R with said shaft.

While I do not wish to limit myself to any certain speed of rotation of the shaft S and discs R, it should be at a slow rate. A variation in the peripheral speed of said discs of from 15 to 45 feet per minute will be suitable for all the variations in character of raw materials to be treated known to me.

The operation of the device is as follows:

The mixture of liquid and comminuted solids enters a spill box $t^1$ through the pipe $t$, drops quietly into the tank T and flows down through the annular space $C^1$ formed by the edges of the discs R and D and the inner vertical sides of the tank T, and into the cells C between the undersides of the discs D and the upper sides of the discs R. At least one outlet orifice $s^7$ is provided for each of the cells C and through this a portion of the liquid from which the comminuted matter has settled out passes into the enlarged portion $S^1$ of the pipe S. The apparatus is preferably designed and proportioned so that a substantially equal amount of the material to be treated enters each of the cells C. As the liquid flows into the cells C from the annular channel $C^1$, the comminuted solids settle out of said liquid upon the top surface of the slowly revolving discs R. The revolution of these discs carries the sediment off the edges of the revolving discs as it accumulates thereon by centrifugal force, keeping them substantially clean. This sediment slides from the upper discs into said annular current of fluid in $C^1$ which leads to the lower cells so that repeated separations occur again and again in said lower cells, the collected masses of solid matter picking up and carrying along with them solids from the mixture thru which they pass until finally the accumulated sludge reaches the chamber designated on the drawings as $C^2$ formed by the bottom of the lower-most disc D and the conical bottom $t^2$. The accumulated sludge is assisted in sliding down the conical bottom $t^2$ into the sludge withdrawal pipe $t^3$ by the action of the scrapers s. Any clear liquid which reaches the chamber $c^2$ escapes through the orifices $s^6$ into the enlarged shaft chamber of $S^1$, and all the accumulated clear liquid in said chamber of $S^1$ flows upwardly therethrough, passes through openings $s^{10}$ into the discharge pipe $s^9$, and through it leaves the tank T.

I claim as my invention and desire to secure by Letters Patent of the United States:

1. The method of separating sediment from the liquid in which it is immersed consisting of passing said mixture while in a quiescent state into shallow circular cells from without inwardly, moving the sludge to the periphery mechanically and taking off the clear liquid from the center.

2. The method of clarification which consists of passing fluid inward radially through cells, the upper and lower surfaces of which are bounded by substantially smooth surfaces, the lower surface rotating and the upper surface remaining stationary so that the solids which are deposited by sedimentation on the lower surfaces are thrown off by centrifugal force and prevented from entering the center of the cell, the clear liquid being withdrawn from the center of said cells.

3. The method of clarification which consists of passing fluid inward radially through cells, the upper and lower surfaces of which are bounded by substantially smooth surfaces, the lower surface rotating and the upper surface remaining stationary so that the solids which are deposited by sedimentation on the lower surfaces are thrown off by centrifugal force and prevented from entering the center of the cell, the clear liquid being withdrawn from the center of said cells, said solids falling through an annular space surrounding said cells to a bottom compartment sloped toward the center where they fall by gravity and are removed from the central point.

4. In an apparatus for separating sediment from the liquid in which it is immersed, the combination of a closed tank, a conical draining bottom through which sludge is removed from said tank, an inlet near the top of said tank to admit the mixture of liquid and comminuted matter to be treated, within said tank a rotatable vertically positioned hollow shaft with its lower end closed, a clear effluent outlet connecting the interior of said shaft with the exterior of said tank toward the top of said tank, a plurality of fixed substantially horizontally placed discs having a central aperture within which said shaft rotates and terminating outwardly short of the walls of said tank, a disc for each of said fixed discs adapted to rest upon said fixed disc and rotatably secured to said shaft, and an effluent aperture through the wall of said shaft under each fixed disc.

5. An apparatus for separating sediment from the liquid in which it is immersed having in combination, a closed vertically placed cylindrical tank, a conical draining bottom through which sludge is removed from said tank, an inlet near the top of said tank to admit the mixture of liquid and comminuted matter to be treated, a rotatable axially positioned hollow shaft with its lower end closed, a clear effluent outlet connecting the interior of said shaft with the exterior of said tank toward the top of said tank, a plurality of fixed substantially horizontal discs having a central aperture within which said shaft rotates and terminating outwardly a short distance from the sides of said tank, for each of said stationary discs a disc rotatably secured to said draft resting upon said fixed disc and an effluent aperture through the wall of said shaft under each fixed disc.

6. An apparatus for separating sediment from the liquid in which it is immersed, having in combination a closed vertically placed cylindrical tank, a conical draining bottom through which sludge is removed from said tank, an inlet near the top of said tank to admit the mixture of liquid and comminuted matter to be treated, a spill box placed around the axis of said tank near the top thereof, a rotatable axially positioned hollow shaft with its lower end closed, a clear effluent outlet connecting the interior of said shaft with the exterior of said tank toward the top of said tank, a plurality of fixed substantially horizontal discs having a central aperture within which said shaft rotates and terminating outwardly a short distance from the sides of said tank, for each of said stationary discs a disc rotatably secured to said shaft resting upon said fixed disc and an effluent aperture through the wall of said shaft under each fixed disc.

7. An apparatus for separating sediment from the liquid in which it is immersed, having in combination a closed vertically placed cylindrical tank, a conical draining bottom through which sludge is removed from said tank, an inlet near the top of said tank to admit the mixture of liquid and comminuted matter to be treated, a rotatable axially positioned hollow shaft with its lower end closed, a clear effluent outlet connecting the interior of said shaft with the exterior of said tank toward the top of said tank, a plurality of fixed substantially horizontal discs having a central aperture within which said shaft rotates and terminating outwardly a short distance from the sides of said tank, for each of said stationary discs a flexible disc rotatably secured to said shaft resting upon said fixed disc and an effluent aperture through the wall of said shaft under each fixed disc.

8. An apparatus for separating sediment from the liquid in which it is immersed, having in combination a closed vertically placed cylindrical tank, a conical draining bottom through which sludge is removed from said tank, an inlet near the top of said tank to admit the mixture of liquid and comminuted matter to be treated, a spill box placed around the axis of said tank near the top thereof, a rotatable axially positioned hollow shaft with its lower end closed, a clear effluent outlet connecting the interior of said shaft with the exterior of said tank toward the top of said tank, a plurality of fixed substantially horizontal discs having a central aperture within which said shaft rotates and terminating outwardly a short distance from the sides of said tank, for each of said stationary discs a flexible disc rotatably secured to said shaft resting upon said fixed disc and an effluent aperture through the wall of said shaft under each fixed disc.

9. An apparatus for separating sediment from the liquid in which it is immersed having in combination a closed vertically placed cylindrical tank, a conical draining bottom through which sludge is removed from said tank, an inlet near the top of said tank to admit the mixture of liquid and comminuted matter to be treated, a spill box placed around the axis of said tank near the top thereof, a rotatable axially positioned hollow shaft with its lower end closed, a clear effluent outlet connecting the interior of said shaft with the exterior of said tank toward the top of said tank, a plurality of fixed substantially horizontal discs having a central aperture within which said shaft rotates and terminating outwardly a short distance from the sides of said tank, for each of said stationary discs, a flexible disc rotatably secured to said shaft resting upon said fixed disc, an effluent aperture through the wall of said shaft under each fixed disc and a scraper for said conical bottom secured to and rotating with said shaft.

10. The method of separating sediment by gravity from the liquid in which it is immersed which consists of passing the liquid to be clarified, radially inward thru one or more substantially circular cells, removing clear liquid from a point substantially at the center of said cells and causing the solids deposted by the ordinary process of sedimentation in the passage of the liquid thru the cells to be swept radially outward to the periphery by centrifugal flows.

In testimony whereof I have hereunto set my hand.

CARL H. NORDELL.